(12) United States Patent
Corrao et al.

(10) Patent No.: US 9,640,329 B2
(45) Date of Patent: May 2, 2017

(54) HYBRID SOLAR CELLS INTEGRATED GLASSBLOCK AND PRESTRESSED PANEL MADE OF DRY-ASSEMBLED GLASSBLOCKS FOR THE CONSTRUCTION OF TRASLUCENT BUILDING ENVELOPES

(71) Applicants: Rossella Corrao, Palermo (IT); Luisa Pastore, Palermo (IT); Marco Morini, Palermo (IT); Alessandra Garraffa, Palermo (IT); Giuseppe Giambanco, Palermo (IT); Giuseppe Trapani, Palermo (IT)

(72) Inventors: Rossella Corrao, Palermo (IT); Luisa Pastore, Palermo (IT); Marco Morini, Palermo (IT); Alessandra Garraffa, Palermo (IT); Giuseppe Giambanco, Palermo (IT); Giuseppe Trapani, Palermo (IT)

(73) Assignees: Rossella Corrao, Palermo (IT); Luisa Pastore, Palermo (IT); Marco Morini, Palermo (IT)

( * ) Notice: Subject to any disclaimer, the term of this patent is extended or adjusted under 35 U.S.C. 154(b) by 0 days.

(21) Appl. No.: 14/382,594

(22) PCT Filed: Mar. 5, 2013

(86) PCT No.: PCT/IT2013/000069
§ 371 (c)(1),
(2) Date: Sep. 3, 2014

(87) PCT Pub. No.: WO2013/132525
PCT Pub. Date: Sep. 12, 2013

(65) Prior Publication Data
US 2015/0027515 A1      Jan. 29, 2015

(30) Foreign Application Priority Data

Mar. 6, 2012 (IT) .............. PA2012A000002
Mar. 6, 2012 (IT) .............. PA2012A000003

(51) Int. Cl.
*H02N 6/00* (2006.01)
*H01L 31/00* (2006.01)
(Continued)

(52) U.S. Cl.
CPC ............. *H01G 9/2059* (2013.01); *E04C 1/42* (2013.01); *E04C 2/546* (2013.01); *H01G 9/2077* (2013.01);
(Continued)

(58) Field of Classification Search
CPC .. H01G 9/2068; H01G 9/2077; H01G 9/2095; H02S 20/22; H02S 20/23; H02S 20/24; H02S 20/25; H02S 20/26
See application file for complete search history.

(56) References Cited

U.S. PATENT DOCUMENTS

| 5,010,704 A | 4/1991 | Thompson |
| 2006/0010810 A1 | 1/2006 | Muszynski |

(Continued)

FOREIGN PATENT DOCUMENTS

| DE | 10306529 A1 | 6/2004 |
| EP | 2065531 A1 | 6/2009 |

(Continued)

OTHER PUBLICATIONS

Hagfeldt et al., "Dye-Sensitized Solar Cells", Chem. Rev., 2010, vol. 110, pp. 6595-6663.
(Continued)

*Primary Examiner* — Eli Mekhlin
(74) *Attorney, Agent, or Firm* — Young & Thompson (57) ABSTRACT

A hybrid solar cells integrated glassblock structure, includes, at least one glass shell (0) having at least a light transparent surface (2, 9, 13) intended to be exposed to solar radiations, a Dye-Sensitized Solar Cell (DSC) device (3, 8) associated to the surface (2, 9, 13) so as to receive solar radiations passing through the surface, the device having electric contacts, at least one hole (7, 11, 15, 17) allowing passage to an external area of the glassblock of electrical connections leading to the device contacts; and a prestressed and dry assembled glassblock panel for the construction of translucent building envelope even in high-rise buildings, which may also provide high performance related to energy production and saving.

8 Claims, 11 Drawing Sheets

(51) Int. Cl.
*H01G 9/20* (2006.01)
*E04C 1/42* (2006.01)
*E04C 2/54* (2006.01)

(52) U.S. Cl.
CPC ............. *Y02B 10/10* (2013.01); *Y02E 10/542* (2013.01); *Y02P 70/521* (2015.11)

(56) References Cited

U.S. PATENT DOCUMENTS

2011/0057504 A1* 3/2011 Nagata ..................... B60B 3/04
301/95.102
2012/0048373 A1* 3/2012 Yang ..................... C08F 255/02
136/259

FOREIGN PATENT DOCUMENTS

JP 5230899 A 9/1993
JP 2012038883 A * 2/2012

OTHER PUBLICATIONS

International Search Report, dated Jun. 20, 2013, from corresponding PCT application.

* cited by examiner

HYBRID SOLAR CELLS INTEGRATED GLASSBLOCK AND PRESTRESSED PANEL MADE OF DRY-ASSEMBLED GLASSBLOCKS FOR THE CONSTRUCTION OF TRASLUCENT BUILDING ENVELOPES

FIELD OF THE INVENTION

The invention relates to glassblocks and hybrid solar cells and also innovative devices having such glassblocks and hybrid solar cells dry assembled in panels for the construction of translucent building envelopes. The field of application is the building and construction sector.

BACKGROUND ART

A glassblock is composed by two glass shells, obtained by pressing a drop of fused glass on a stamp and joined together through hot or cold gluing processes creating an internal cavity. The glassblock allow the passage of light in various percentages depending on the colour of the glass and the finishing of the faces of the glass shells.

Glassblocks may be preferred to traditional flat glass for the construction of translucent building envelopes, because of their better performance in terms of thermal and acoustic insulation, fire-resistance (due to the presence of the cavity), light transmission and modularity.

A Dye-Sensitized Solar Module may be composed by a number of Dye-Sensitized Solar Cells (DSC) also known hybrid solar cells.

The typical structure of a Dye-Sensitized Solar Cell is composed of a transparent substrate (for example, glass) made conductive with a thin layer of transparent conductive oxide (TCO) (for example FTO, Fluorine-doped Tin Oxide) and then coated with a mesoporous film of a semiconductor material, commonly the a-toxic and biocompatible $TiO_2$. The photoactive dye molecules are absorbed on the $TiO_2$ surface, constituting the photoanode of the DSC device; then the cell is closed with a counter electrode of a transparent FTO superstrate coated with a platinum film with the function of catalyst. At the end, the device is hermetically closed trough a sealant (such as resins or glass frits) and filled with an electrolyte solution, completing the cell and allowing the mechanism of functioning.

A DSC works by optical molecular excitations, electrons and ions transfers, with a process that mimics the plants photosynthesis.

DSC technologies have recently achieved global levels of efficiency (both as regards cells and modules) that are comparable to silicon-based solar technology that dominates the market today.

The state of the art has already come up with some DSC products on the market. These modules are sold in components or complete packages also suitable for building integration.

The traditional wet assembly system used to build glassblock panels/walls/roofing is not suitable for the construction of high-rise building envelopes made, in particular, of glassblock panels installed outside the vertical plane of the building structure. Precast glassblock panels assembled with mortar and steel rods, because of their structure, can be assimilated to masonry walls, arising the typical disadvantages related to the stress due to the forces perpendicular to the wall surface. The horizontal wind force acting on the panels, indeed, originates flexural deformations of variable entity depending on different factors. Hence, the unsuitableness of the wet assembly system for the construction of glassblock building envelopes, especially in tall buildings, can be easily acknowledged.

The analysis of the state of the art highlighted the existence of several patents showing different solutions for the construction of precast dry-assembled glassblock panels. However, they generally refer to indoor application and not to the construction of building façades. Among the most significant solutions, those referring to continuous or partially continuous profiles—acting as supporting structure of the panels—can be mentioned. These profiles are positioned between the glassblocks, which collaborate actively to increase the mechanical resistance of the panel besides serving as closure elements (i.e. Earl Thompson, Glass block construction assembly, U.S. Pat. No. 5,010,704, 30 Apr. 1991). Patents related to such dry assembly systems essentially differ one from the other for the material used to make the supporting elements (i.e. steel, aluminium, plastic) and for their shape. The aluminium or plastic profiles can then be provided with special housing for the positioning of stiffening rods in order to allow the construction of panels/walls able to bear quite elevated mechanical stresses. Among all the analysed patents, only the one belonging to Shimizu Construction Co. Ltd (no. JP5230899(A) of 1993) foresees the construction of glassblock panels which are prestressed in two directions (vertical and horizontal).

LIST OF DRAWINGS

In the drawings:

FIGS. 1.1-5.5 show various embodiments of a glassblock according to the invention;

FIGS. 6-9 show a panel according to the invention. In particular:

FIG. 1.1 shows an axonometric exploded view of the glassblock configuration individuated in the description as Hypothesis 1 and presented in the point [0014];

FIG. 1.2 shows a front view of said configuration;

FIG. 1.3 shows a scaled-up cross section of a detail in said configuration;

FIG. 1.1*a* shows an axonometric exploded view of the glassblock configuration individuated in the description as Hypothesis 1a and presented in the point [0017];

FIG. 1.2*a* shows a front view of said configuration;

FIG. 1.3*a* shows a scaled-up cross section of a detail in said configuration;

FIG. 2.1 shows an axonometric exploded view of the glassblock configuration individuated in the description as Hypothesis 2 and presented in the point [0018];

FIG. 2.2 shows a front view of said configuration;

FIG. 2.3 shows a scaled-up cross section of a detail in said configuration;

FIG. 2.1*a* shows an axonometric exploded view of the glassblock configuration individuated in the description as Hypothesis 2a and presented in the point [0020];

FIG. 2.1*a* shows a front view of said configuration;

FIG. 2.2*a* shows a scaled-up cross section of a detail in said configuration;

FIG. 3.1 shows an axonometric exploded view of the glassblock configuration individuated in the description as Hypothesis 3 and presented in the point [0022];

FIG. 3.2 shows a front view of said configuration;

FIG. 3.3 shows a scaled-up cross section of a detail in said configuration;

FIG. 3.1*a* shows an axonometric exploded view of the glassblock configuration individuated in the description as Hypothesis 3a and presented in the point [0024];

FIG. 3.2a shows a front view of said configuration;

FIG. 3.3a shows a scaled-up cross section of a detail in said configuration;

FIG. 4.1 shows an axonometric exploded view of the glassblock configuration individuated in the description as Hypothesis 4 and presented in the point [0027];

FIG. 4.2 shows a cross section of said configuration;

FIG. 4.3 shows a front view of said configuration;

FIG. 4.4 shows a scaled-up cross section of a detail in said configuration;

FIG. 5.1 shows a front view of the disassembled configuration of the plastic profile individuated in the description as "thermal belt" and presented in the point [0026], in this case mounted with a DSC module;

FIG. 5.2 shows a front view of the assembled configuration of said plastic profile;

FIG. 5.3 shows a horizontal cross section of said plastic profile;

FIG. 5.4 shows a side view of the disassembled configuration of the glassblock individuated in the description as Hypothesis 4 and presented in the point [0027];

FIG. 5.5 shows a side view of the assembled configuration of said glassblock;

FIG. 8.1 shows a top view and a cross section of a vertical profiles of the said panel;

FIG. 8.2 shows a top view and two cross sections of a horizontal profile of the said panel;

DETAILED DESCRIPTION

The application of the hybrid solar cells on the glassblock may occur in several ways. DSCs may be applied by deposition on the external surface of one of the glass shells (Hypotheses 1 and 2) or on the internal one (Hypothesis 3); it may be assembled separately on a specific support and then fixed to the glassblock on the external side of the glass shells (Hypotheses 1a, 2a) or on the internal one (Hypothesis 3a) or in between the two shells that compose the block itself by using a special profiled plastic gasket, functioning also as a "thermal belt", on which the glass shells are cold-glued (Hypothesis 4). The deposition of the active layers may occur through simple screen-printing processes, that also allow the design of particularly shaped DSC modules.

For the purpose of this invention, the production process depends on the way the solar module is applied on the glassblock.

Each of the Hypotheses refers to a different glassblock configuration. From each Hypothesis of DSC-integrated glassblock two electric connections come out (+/−) for the connection with other glassblocks/PV modules and for the creation of a dry-assembled PV panel (18) (FIG. 6), able to be used for the construction of translucent building envelopes. The horizontal and vertical cavities that result from the juxtaposition of contiguous glassblocks will house plastic profiles (20, 21) containing stiffening steel rods (23) of the panel (18) and the electric interconnections.

Figure 11:
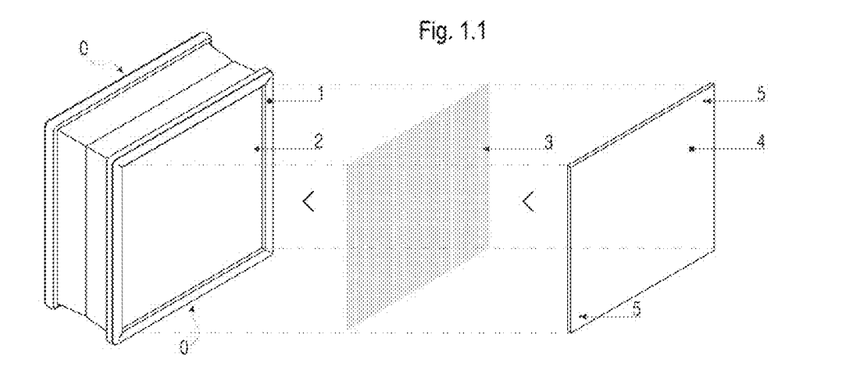
Figure 12:
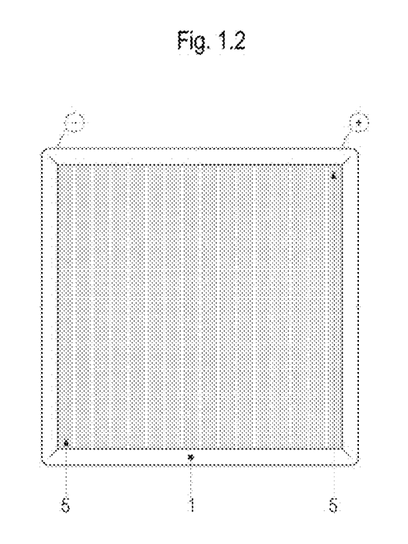
Figure 13:
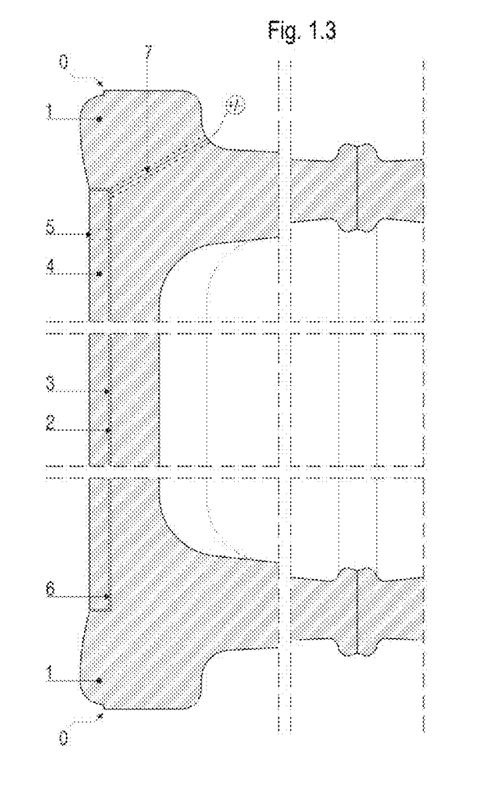

The Hypothesis 1 (FIGS. 1.1, 1.2, 1.3) foresees the modification of the shape of one of the glass shells (0)—supposedly the one exposed to the sun—for the integration with DSCs. The configuration of the face (2) of the glass shell (0) has a border (1) running through all the perimeter of the external face like a frame. The face (2) can be coated with different TCOs. The border (1) has an adequate thickness, in order to allow the integration of the glass sheet (4) previously coated with TCO and a layer of catalyst and used to close the cells (3) which are deposed in the plane area (2) of the glass shell (0). The border subtracts efficient area for the deposition but it can be useful for better fixing the glass sheet and the protection of its edges. The traditional hot gluing assembly of the glassblock is maintained: in fact, the deposition of the cells (3) is realised after the assembly of the glassblock. Separating the assembly processes of the glassblock from the deposition of the DSC layers is an advantage in the realization of the product. The electrolyte filling can be made, after the assembly of the transparent electrodes and the sealing of the device, through holes (5) on the surface of the closing glass sheet (4), that is necessary for the protection and the functioning of the cells (3). The holes must be closed through a transparent sealant. The device is hermetically closed through a sealant (6) in order to protect it from the atmospheric agents and to fix the closing glass sheet (4) to the glass shell (0). For the electrical connection (+/−) coming out of the device, at least one hole (7) through the glass shell (0) is foreseen. In the case of a translucent dry-assembled photovoltaic panel (18), the electric connections can be grouped and hidden inside plastic profiles (20, 21), housed in the spaces between juxtaposed glassblocks.

In the Hypothesis 1, described at the point [0014], the possibility of substituting the liquid electrolyte with quasi-solid (gels) polymeric materials can be also explored, so that the problem of the encapsulation and the evaporation of the liquid electrolyte can be avoided and the deposition may occur through other processes.

It is also possible to foresee the inversion of the electrodes and thus of the DSC (3) deposition process in order to guarantee a higher efficiency and an easier process of manufacture of the device, by depositing the catalyst on the plane area (2) of the glass shell (0) and applying the cells (3) on the glass sheet (4), previously TCO coated. In this way, the active layers would be exposed on the external side of the glassblock eventually catching a higher rate of solar radiation.

The Hypothesis 1a (FIGS. 1.1a, 1.2a, 1.3a) foresees the possibility of integrating in the modified glass shell (0), described in the Hypothesis 1, a complete DSC module (8) already manufactured in which both the electrodes are made of conductive glass sheets. It may be positioned in the plane area (2) of the glass shell (0), framed by the border (1). The Hypothesis 1a, on the one hand, means a larger use of glass and, on the other hand, it may also lead to a simplification of the production of the device (DSC module plus glassblock).

Figure 21:
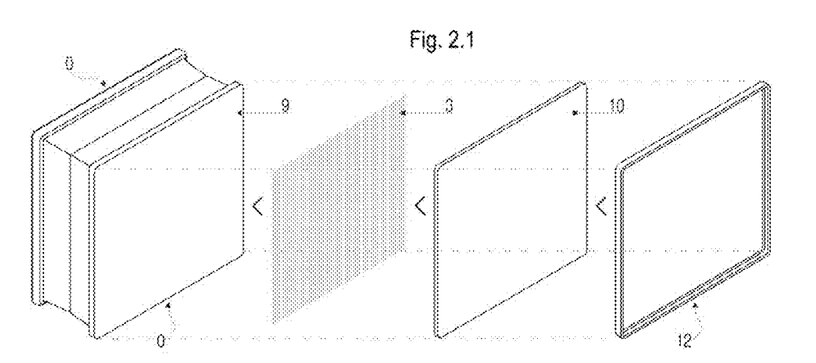
Figure 22:
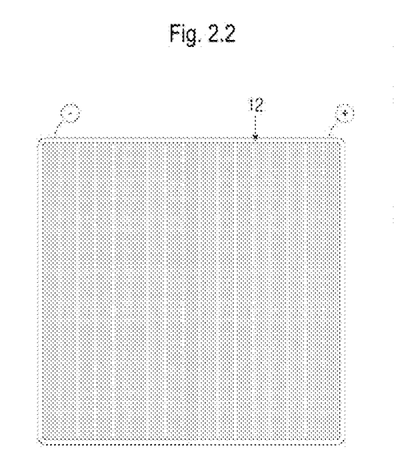
Figure 23:
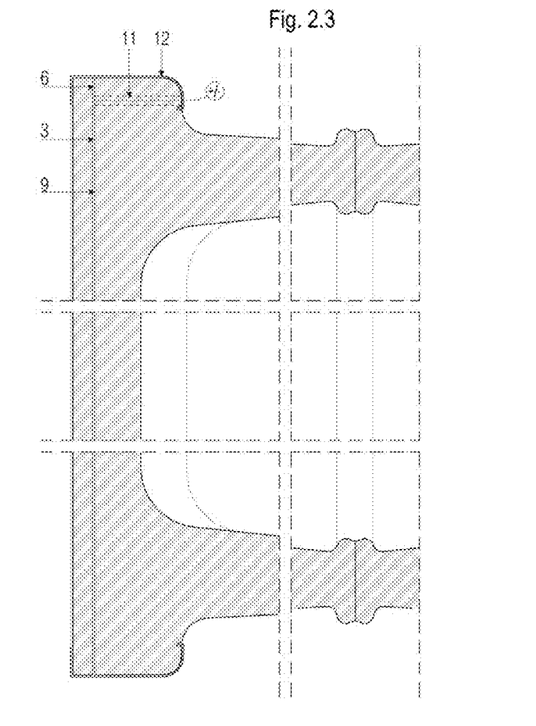

The Hypothesis 2 (FIGS. 2.1, 2.2, 2.3) foresees the modification of the glass shell (0) and the integration of the DSC with the already assembled glassblock. This solution increases the active area for the deposition of the DSC. The entire face (9) of the glass shell (0) is flattened, so that it can possibly offer a complete plane area for the deposition of the solar cells (3). It represents the transparent substrate of the solar device, which is closed by a glass sheet (10) appropriately shaped and fixed to the glass shell (0) itself by means of a sealant (6) applied on a boundary running through the whole perimeter of the DSCs. Working with two planar surfaces, in contact with each other, can simplify the process of electrolyte injection that can use the joust between the electrodes and avoid the hole-drilling process on the surface of the closing glass sheet (10). For the electrical connection (+/−) coming out of the device, at least one hole (11) through the glass shell (0) are foreseen. In the case of a translucent dry-assembled photovoltaic panel (18), the electric connections can be grouped and hidden inside plastic profiles (20, 21), housed in the spaces between juxtaposed glassblocks.

For the Hypotesis 2 is also possible to foresee the substitution of the electrolyte, as described in point [0015]. It is also possible to foresee the inversion of electrodes as described in point [0016].

The Hypothesis 2a (FIGS. 2.1a, 2.2a, 2.3a) foresees the possibility of integrating in the modified face (9) of the glass shell (0) as described in the Hypothesis 2a complete DSC module (8) already manufactured. It is fixed on the plane face (9) of the glass shell (0). This means a larger use of glass, in fact, the surface of the glass shell (0) does not constitute the substrate of the cells but, at the same time, this Hypothesis may lead to a simplification of the production of this device (DSC module plus glassblock).

A weak point in the configurations of the glassblock described in the points [0018] and [0020] may be represented by the edges of the upper glass sheet, which is positioned on the plane area (9) of the glass shell (0) of the already assembled glassblock. Then a protection element may be needed, like a gasket that can protect the device from the possible decay due to the atmospheric agents and also guarantee the mechanical resistance of the edges. The protective frame (12) can be made of plastic material and is fixed to the perimeter of the glass shell (0) with a mechanical joint, e.g. through a gutter on the back part of the glass shell (0) and/or through a cold gluing. For the Hypothesis 2a described in the point [0020] this protective frame may imply a simplification in the assembly of the glassblock and in the maintenance and/or substitution of the device.

Figure 31:
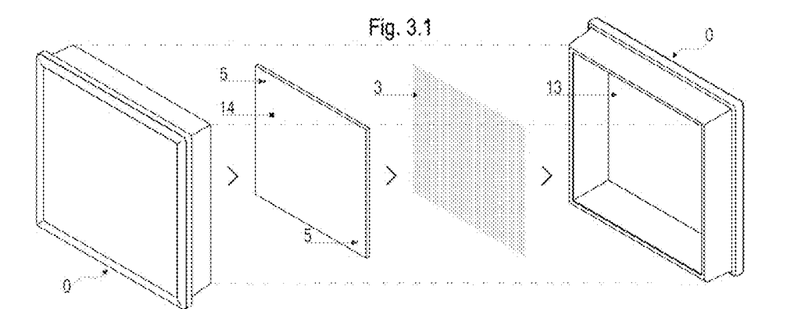
Figure 32:
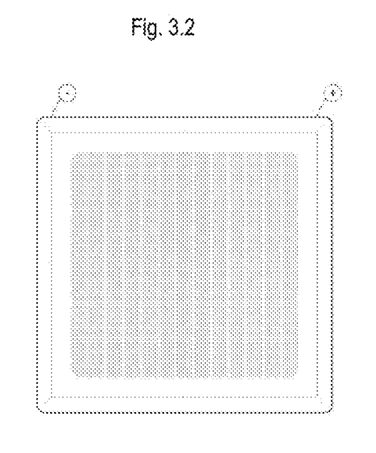
Figure 33:
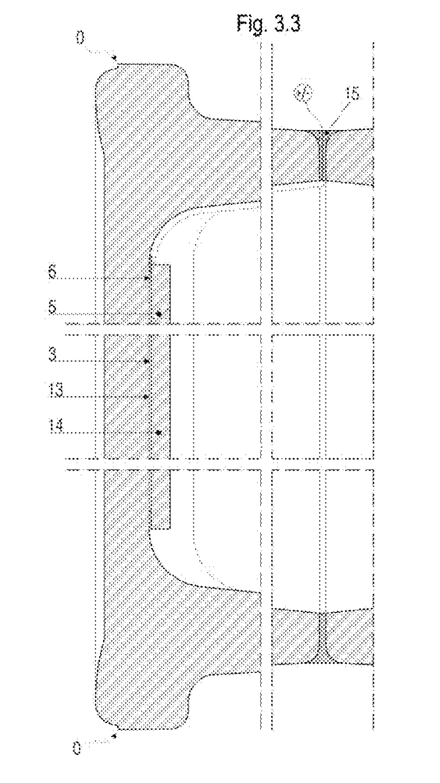
Figure 41:
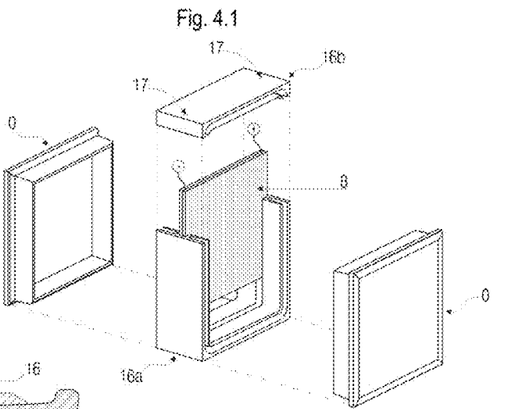
Figure 42:
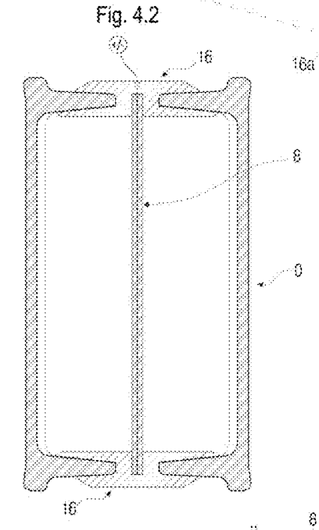
Figure 43:
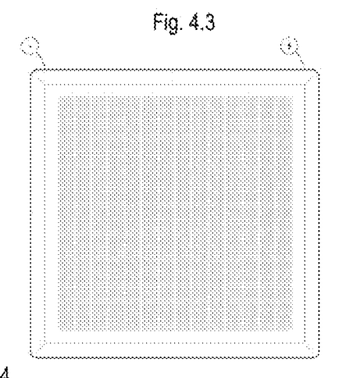
Figure 44:
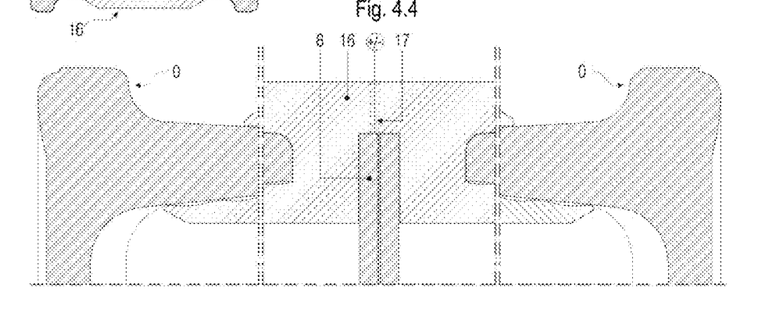
Figure 51:
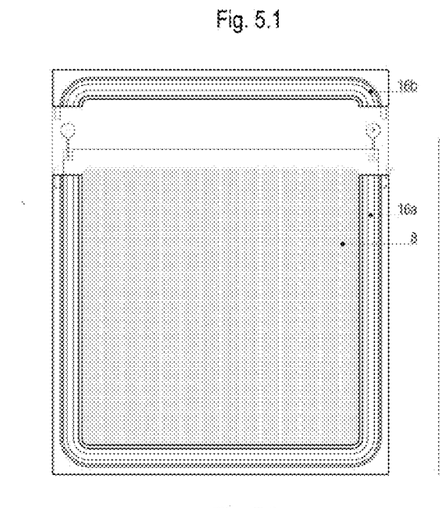
Figure 52:
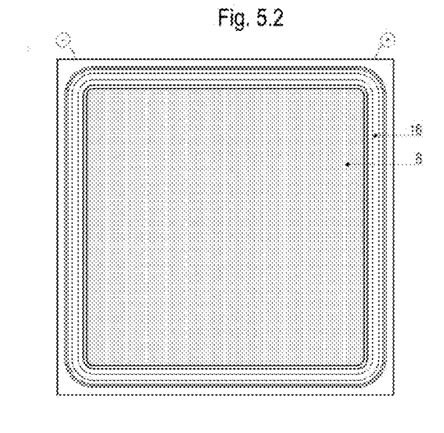
Figure 54:
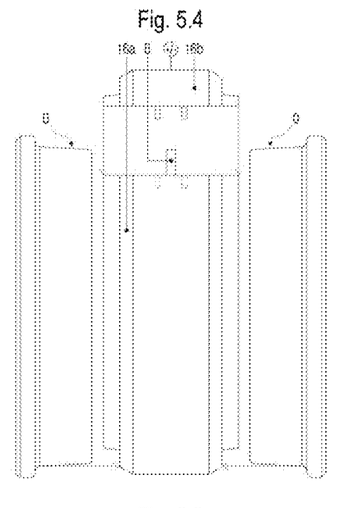
Figure 55:
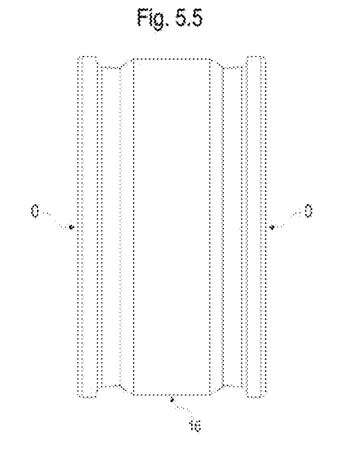
Figure 81:
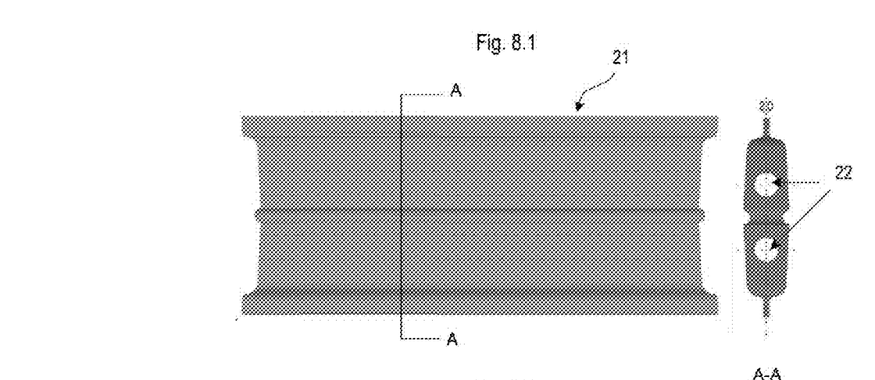
Figure 82:
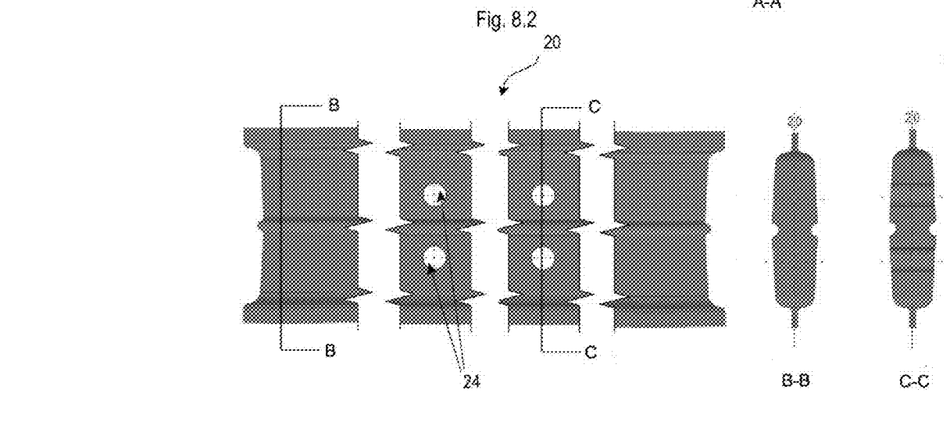

In Hypothesis 3 (FIGS. 3.1, 3.2, 3.3) the shape of the glass shell (0) is maintained: its internal planar face (13) functions as the substrate for the deposition of the cells (3). Then a glass sheet (14) appropriately shaped is used to close the device. The position of the cells inside the cavity of the glassblock, on the one hand, is a great advantage in terms of durability of the device, in fact, it is protected from the external environment and, consequently, from the atmospheric agents (like rain, hail, wind) and other mechanical or chemical agents. On the other hand, the deposition of cells (3) cannot occur when the glassblock is assembled and, moreover, the traditional hot gluing of the two glass shells (0), with its high temperatures (900° C.), would be fatal for the DSCs, so a cold-assembly, by means of resins, must be used. After the assembly of the electrode—constituted by the glass sheet (14)—and the sealing (6) of the device, the electrolyte filling can be made through holes (5) on the surface of the closing glass sheet (14), which must be sealed then. The electric connections (+/−) will run inside the cavity of the glassblock, coming out through at least one hole (15) drilled in the resin of the joint between the two glass shells (0).

For the Hypothesis 3 it is also possible to foresee the substitution of the electrolyte, as described in point [0015].

The Hypotesis 3a (FIGS. 3.1a, 3.2a, 3.3a) foresees the integration of an already manufactured DSC module (8) on the plane internal face (13) of one of the glass shells. This means a larger use of glass, in fact, the internal surface of the glass shell (0) does not constitute the substrate of the cells but, at the same time, this Hypothesis may lead to a simplification of the production of this device (DSC module plus glassblock).

The Hypothesis 4 (FIGS. 4.1, 4.2, 4.3, 4.4) is based upon a new configuration of the glassblock for the optimisation of the thermal performance of the product, consisting on the subdivision of the internal cavity of the glassblock—in order to reduce the transmittance and, in particular, the convection—through the insertion of a sheet made of glass or different semitransparent high-insulating materials, such as polycarbonate+aerogel, aerogel or polycarbonate inside the glassblock itself.

A "thermal belt" (16) is used for the insertion of the insulating sheet and for the creation of a thermal break (FIGS. 5.1, 5.2, 5.3). It is made of a plastic profile on which the two glass shells (0) are cold glued (FIGS. 5.4, 5.5).

In the Hypothesis 4 (FIGS. 4.1, 4.2, 4.3, 4.4) a DSC module (8) is inserted in the "thermal belt" (16) replacing the sheets of different materials mentioned at point [0025]. The "thermal belt" offers the support for the DSC module through an easy assembly system. The U-shaped part of the "thermal belt" (16a) houses the DSC module (8) and is closed with an upper part (16b) by means of a male and female connection system. Then the glass shells (0) are cold glued to the assembled "thermal belt".

In the Hypothesis 4 the "thermal belt" (16) also presents at least one hole (17) for the electric connection (+/−) coming out of the device. The holes for the wires are positioned in the upper profile (16b) of the "thermal belt".

The DSC device, being bifacial and positioned in the middle of the glassblock, can easily absorb light coming from the external environment as well as from the indoor. The internal face of the glass shells (0) can be finished or modified in order to allow the optimisation of the light reaching the DSC module. Otherwise, the two glass shells (0) may stay unvaried. However, it is possible to foresee to modify the dimension of the side faces of the glass shells (0) in order to obtain different dimension of the cavity inside the glassblock, in accordance to the different levels of thermal/acoustic insulation of the product. This Hypothesis represents an advantage in terms of industrial production, because it is possible to utilize ready-to-use DSC modules, customized for the integration in the "thermal belt", and then easily proceed with the assembly of the glass shells.

For the construction of the translucent panel (18) made of glassblocks (19), both traditional or PV integrated—like those described in the points from [0014] to [0029]—, an innovative dry assembly system is also provided in the present invention.

The new dry assembly system overcomes the limits derived from the traditional wet assembly system, conferring adequate mechanical resistance to the panels. The invention exploits the performance related to the mechanical resistance of glassblocks that can behave as active components of the panel in response to the external stresses. [0032] The prestress technique is at the base of the present invention, and it foresees the prestress of the panel only in the vertical direction, corresponding to its prevalent dimension. This allows the predisposition of the necessary elements for the prestress only at the top and bottom of the panel and the possibility to place the panels side by side maintaining a very thin joint and the continuity of the horizontal bands that constitute the building envelope itself. The prestress applied to the glassblock panel generates a state of stress opposite to the one due to horizontal forces (i.e. wind or earthquake action): the overlapping of the two states of stress (prestress+horizontal force) determines a higher resistance of the panel under the action of external forces.

The effects due to the prestress of the panel also allow the possibility to install it in a horizontal position in order to construct, for example, translucent roofing. In this case, the prestress would balance the action due to vertical loads (own weight, accidental loads—snow, wind, etc—).

Figure 1:
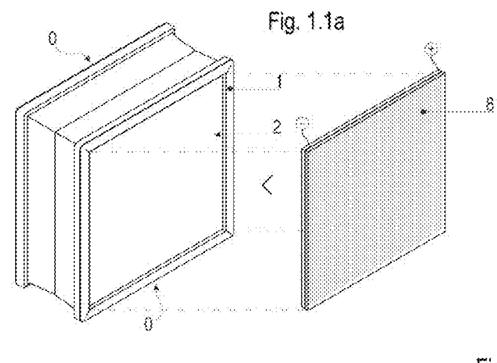
Figure 2:
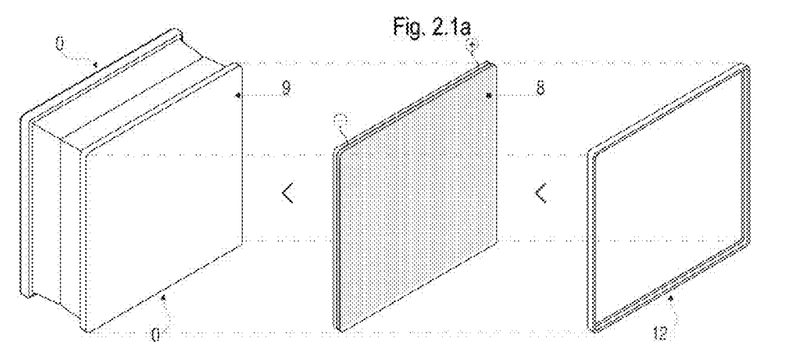
Figure 3:
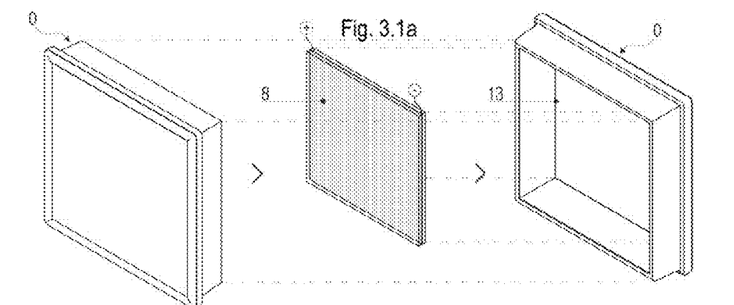
Figure 6:
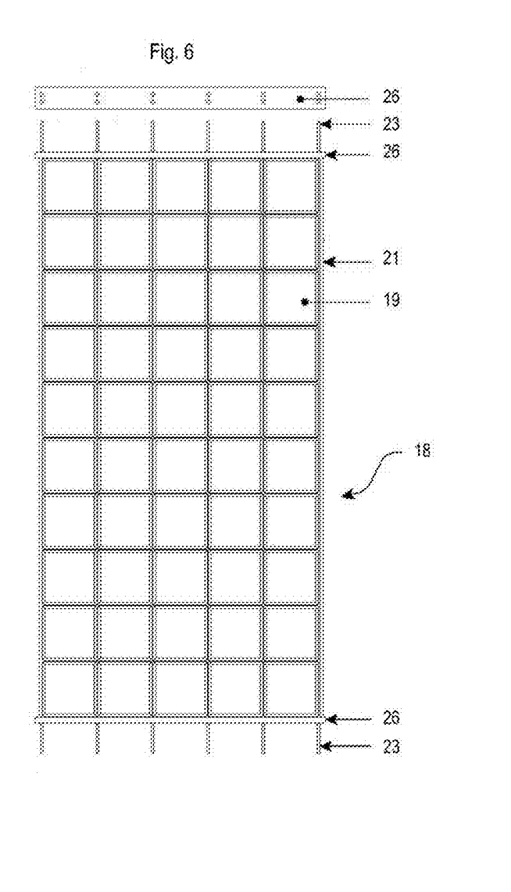
FIG. 6 shows a front and top view of a panel according to the invention presented in the point [0033]
Figure 7:
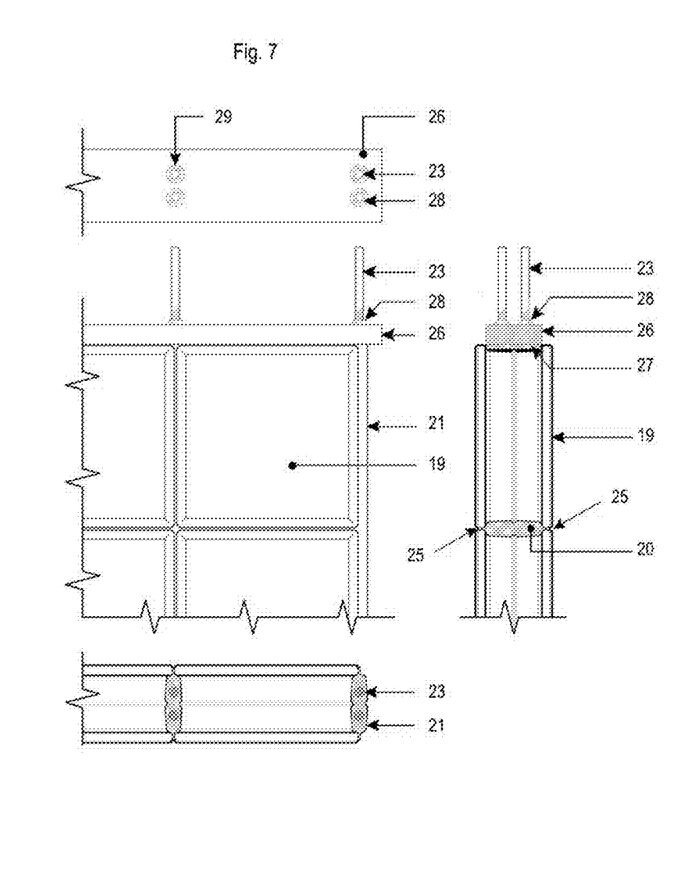
FIG. 7 shows a scaled-up front and top view and a cross section of a detail in said panel.
Figure 9:
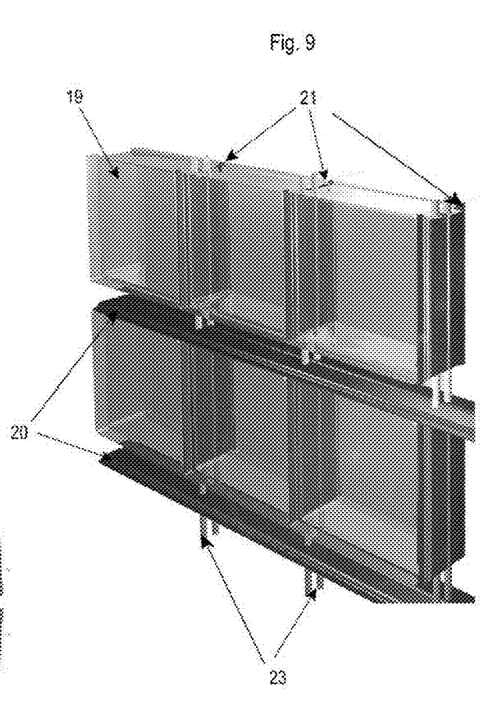
FIG. 9 shows an exploded 3D view of the said panel.

The panel (18) is made of dry-assembled glassblocks (19), both traditional or PV integrated—like those described in the points from [0014] to [0029] (FIG. 6). Inside the cavity between two contiguous glassblocks, a supporting structure made of plastic material is positioned. The supporting structure is made of horizontal continuous elements (20) with length equal to the base of the panel (18) and of vertical elements (21) with length equal to the dimension of the glassblock (19) (FIG. 9). The vertical elements (21) are provided with holes (22) for the passage of vertical stiffening steel rods (23) used for the prestress process (FIG. 8.1). The horizontal profiles (20) are also provided with holes (24) for the passage of vertical stiffening steel rods (23) (FIG. 8.2) The supporting structure (20, 21), shaped in accordance to the form of the cavity between glassblocks (19), adhere to the lateral faces of the glassblocks and distance their little projecting wings with only 2 mm-thick joints (25) (FIG. 7). The supporting structure (20, 21) has different functions; the vertical profiles (21) are needed for the passage of the stiffening steel rods (23) necessary for the prestress; the horizontal profiles (20) are needed to impart and uniformly distribute the effect of the prestress on the glassblocks rows (FIG. 9); when the glassblocks are PV integrated—like those described in the points from [0014] to [0029]—, the horizontal profiles (20) are modified in order to house the electric connections of the panel. For the prestress of the panel (18) a steel plate (26) is positioned at the top and bottom of the panel (18) on a plastic plate (27), necessary to separate the steel plate from the lateral faces of the glassblocks (19). The plastic plate (27) is leant on a layer of resin to be fixed to the lateral faces of the glassblocks. The two previous plates (26, 27) are provided with holes for the passage of the steel rods (23) that are stressed through clamping nuts (28), after the positioning of steel washers (29) between the steel plate (26) and the clamping nuts (28), (FIG. 7). The invention allows to easily assemble glassblocks for the construction of panels that can have different dimensions also according to the different dimensions of the glassblocks themselves.

The assembly of the panel that can occur inside the factory and not in the construction site (as it usually happens for the wet assembly of traditional glassblocks), allows the rationalization of the constructive process guaranteeing the quality of the product and reducing the time and cost for the construction of translucent façades and roofing. Moreover, the use of the prestress technique guarantees high mechanical performance of the panel as well as high quality related to the aspect of the building. Summarizing the above description, a glassblock integrated with hybrid solar cells (also known as Dye-sensitized Solar Cell—DSC) and a dry-assembled panel made of traditional or DSC-integrated glassblocks are disclosed. The combination of the glassblock and the DSC module, allows the improvement of the glassblock performance in terms of energy saving and production. The final complete product owns the qualities of both the components (glassblock and DSC module) that are optimized to produce clean energy. The transparency and the thereto-acoustic insulation of the glassblock may be modulated according to the specific requirements of each case of installation. Since the DSCs can be printed in different colours and with various patterns, it is possible to intervene also on the glassblock aesthetical aspect and to easily make drawings on the building façades, thanks to the modularity of the glassblock and the panel. Moreover, DSCs can be energetically active in different light conditions (even in diffuse light, also converting internal artificial light) and independently from the angle of the solar radiation.

The invention presents seven Hypotheses of integration of the DSCs with glassblock and the system to assemble the new product and/or the traditional glassblock in prestressed panels, which constitute the building envelope even in high-rise buildings. This assembly system implies favourable economies in terms of costs and materials, since further technical elements for the construction of the building envelope are no more needed. The supporting structure of the panel is constituted by plastic profiles that are placed in the horizontal and vertical cavities resulting from the juxtaposition of the glassblocks. The supporting structure houses stiffening steel rods and electric connections (in case of DSC-integrated glassblocks for the construction of photovoltaic panels). To overcome the limits due to the wet assembly system, traditionally used to assemble glassblocks, a prestressing force is applied to steel rods in order to confer to the panel an adequate mechanical resistance against the actions perpendicular to its installation plane, such as wind and earthquake. In this configuration the mechanical resistance of the glassblocks is exploited. The unidirectional prestress (along the prevalent dimension of the panel) is obtained through the grip of the nuts inserted in the steel rods, opposing to the steel plates positioned at the top and bottom of the panel. The steel plates are positioned on plastic plates fixed to the lateral faces of the glassblocks by means of resins.

The invention claimed is:

1. A hybrid solar cells integrated structure, comprising, a glass shell comprising a glass block having a planar light transparent surface configured to be exposed to solar radiations;
a complete dye-sensitized Solar Cell (DSC) module directly fixed to the planar light transparent surface of the glass block with sides normal to the planar light transparent surface extending therefrom, so as to receive solar radiations passing through said planar light transparent surface, said module having electric contacts; and
a hole allowing passage to an external area of the glass block of electrical connections leading to said electrical contacts.

2. The structure according to claim 1, comprising a closure conductive glass plate applied on said complete dye-sensitized Solar Cell (DSC) module to form a gap, the closure plate having one or more holes through which an electrolyte is filled in said gap.

3. The structure according to claim 1, comprising a glass sheet being applied on said complete dye-sensitized Solar Cell (DSC) module by means of a sealant applied on a boundary around a whole perimeter of the complete dye-sensitized Solar Cell (DSC) module so creating a joint through which an electrolyte is filled in.

4. The structure according to claim 3, wherein a protective frame is fixed to a perimeter of the glass shell with a mechanical joint or through cold gluing.

5. The structure according to claim 1, comprising two glass shells assembled by a resin joint having holes allowing passage to an outer area of the glass block of electrical connections leading to said electrical contacts, wherein
said planar light transparent surface is a light transparent internal surface of the glass shell, a closure conductive glass plate being applied on said DSC module by a seal to form a gap, the closure conductive glass plate having one or more holes through which an electrolyte is filled in said gap.

6. The structure according to claim 1, comprising two glass shells assembled by a thermal belt made of a thermal insulating profile on which the two glass shells are cold glued and in which one or more holes are made allowing passage to an external area of the glass block of electrical connections leading to said electrical contacts, wherein the Dye-Sensitized Solar Cell (DSC) module is mounted to said thermal belt.

7. The structure according to claim 6, in which said module is a bifacial module.

8. A hybrid solar cells integrated structure, comprising,
a first glass shell comprising a glass block having a planar light transparent surface intended to be exposed to solar radiations;
a complete dye-sensitized Solar Cell (DSC) module directly fixed to the planar light transparent surface of the glass block with sides normal to the planar light transparent surface extending therefrom, so as to receive solar radiations passing through said planar light transparent surface, said module having electric contacts;
a hole allowing passage to an external area of the glass block of electrical connections leading to said electrical contacts; and
a second glass shell, wherein
the first and second glass shells are assembled by a resin joint having holes allowing passage to an external area of the glass block of electrical connections leading to said electrical contacts, wherein said light transparent surface is a light transparent internal surface of the first glass shell.

* * * * *